(12) United States Patent
Luo et al.

(10) Patent No.: US 11,954,590 B2
(45) Date of Patent: Apr. 9, 2024

(54) ARTIFICIAL INTELLIGENCE JOB RECOMMENDATION NEURAL NETWORK MACHINE LEARNING TRAINING BASED ON EMBEDDING TECHNOLOGIES AND ACTUAL AND SYNTHETIC JOB TRANSITION LATENT INFORMATION

(71) Applicant: INDEED, INC., Austin, TX (US)

(72) Inventors: Haiyan Luo, San Jose, CA (US);
Shichuan Ma, Dublin, CA (US);
Anand Joseph Bernard Selvaraj, Fremont, CA (US); Yu Sun, Austin, TX (US)

(73) Assignee: Indeed, Inc., Austin, TX (US)

( * ) Notice: Subject to any disclaimer, the term of this patent is extended or adjusted under 35 U.S.C. 154(b) by 753 days.

(21) Appl. No.: 16/944,972

(22) Filed: Jul. 31, 2020

(65) Prior Publication Data
US 2021/0034975 A1 Feb. 4, 2021

Related U.S. Application Data

(60) Provisional application No. 62/882,340, filed on Aug. 2, 2019.

(51) Int. Cl.
*G06N 3/08* (2023.01)
*G06N 3/04* (2023.01)
*G06Q 10/105* (2023.01)

(52) U.S. Cl.
CPC ............... *G06N 3/08* (2013.01); *G06N 3/04* (2013.01); *G06Q 10/105* (2013.01)

(58) Field of Classification Search
CPC ........... G06N 3/08; G06N 3/04; G06Q 10/105
See application file for complete search history.

(56) References Cited

U.S. PATENT DOCUMENTS 10,643,183 B2 5/2020 Tian et al.
2018/0060755 A1* 3/2018 Green ............... H04L 67/535
(Continued)

OTHER PUBLICATIONS

"Help Me Find A Job: A Graph-based Approach for Job Recommendation at Scale," 2017 IEEE International Conference on Big Data, arXiv, Jan. 1, 2018, Shalaby et al (Year: 2018).*
(Continued)

*Primary Examiner* — Michael J Huntley
*Assistant Examiner* — Paul J Breene
(74) *Attorney, Agent, or Firm* — Young Basile Hanlon & MacFarlane, P.C.

(57) ABSTRACT

An artificial intelligence (AI) job recommender system and methods implement neural network machine learning by generating and utilizing actual and synthetic training data to identify, learn, and apply latent job-to-job transition information and trends to improve job recommendations. The AI job recommender system and method represent technological advances that, for example, identify data representations, identify multiple instances of latent information in actual data, develop synthetic training data, create a directed graph from latent, directional information, embed the directed graph into a vector space, and apply machine learning algorithms to technologically advance and transform a machine into a specialized machine that learns and improves job recommendations across the vector space.

25 Claims, 10 Drawing Sheets

(56) References Cited

U.S. PATENT DOCUMENTS

| | | | | |
|---|---|---|---|---|
| 2018/0174105 A1* | 6/2018 | Kenthapadi | ....... | G06F 16/24578 |
| 2019/0130281 A1* | 5/2019 | Yang | ...................... | G06N 3/044 |

OTHER PUBLICATIONS

"Knowledge Graph Representation via Similarity-Based Embedding," Scientific Programming, Hindawi, Tan et al (Year: 2018).*

Lada A. Adamic and Eytan Adar, Friends and Neighbors on the Web, Social Networks vol. 25, Issue 3, Jul. 2003, pp. 211-230.

Sergio Casas, Uber Advanced Technologies Group, University of Toronto, 2nd Conference on Robot Learning (CoRL 2018), Zurich, Switzerland, pp. 1-10.

Paul Covington, et al, Deep Neural Networks for YouTube Recommendations, Google, Mountain View, California, 2016, pp. 1-8.

Palash Goyal and Emilio Ferrara, Graph Embedding Techniques, Applications, and Performance: A Survey, University of Southern California, Information Sciences Institute, Marina del Rey, California, pp. 1-19.

Aditya Grover and Jure Leskovec, node2vec: Scalable Feature Learning for Networks, Stanford University, Standford, California, Aug. 2016, pp. 1-10.

Huifeng Guo, et al, Shenzhen Graduate School, Harbin Institute of Technology, China, Proceedings of the Twenty-Sixth International Joint Conference on Artificial Intelligence, Mar. 13, 2017, Melbourne, Australia, pp. 1725-1731.

Jiankai Sun, et al, ATP: Directed Graph Embedding with Asymmetric Transitivity Preservation, Association for the Advancement of Artificial Intelligence, 2019, pp. 1-9.

Leo Katz, A New Status Index Derived from Sociometric Analysis, Psychometrika, vol. 18, No. 1, Mar. 1953, pp. 1-5.

Yi-An Lai, et al, PRUNE: Preserving Proximity and Global Ranking for Network Embedding, 31st Conference on Neural Information Processing Systems (NIPS 2017), Long Beach, California, pp. 1-10.

David Liben-Nowell, et al, The Link Prediction Problem for Social Networks, Laboratory for Computer Science, Massachusetts Institute of Technology, Cambridge, Massachusetts, Jan. 8, 2004, pp. 1-19.

Tomas Mikolov, et al, Distributed Representations of Words and Phrases and their Compositionality, Google, Inc., Mountain View, California, 2013, pp. 1-9.

Mingdong Ou, et al, Asymmetric Transitivity Preserving Graph Embedding, KDD '16: Proceedings of the 22nd ACM SIGKDD International Conference on Knowledge Discovery and Data Mining, San Francisco, California, Aug. 2016, pp. 1105-1114.

Jeffrey Pennington, et al, GloVe: Global Vectors for Word Representation, Proceedings of the 2014 Conference on Empirical Methods in Natural Language Processing (EMNLP), Oct. 25-29, 2014, Doha, Qatar, pp. 1532-1543.

Bryan Perozzi, et al, DeepWalk: Online Learning of Social Representations, KDD '14: Proceedings of the 20th ACM SIGKDD International Conference on Knowledge Discovery and Data Mining, New York, New York, Aug. 2014, pp. 701-710.

Badrul Sarwar, et al, Item-Based Collaborative Filtering Recommendation Algorithms, WWW '01: Proceedings of the 10th international conference on World Wide Web, Hong Kong, China, Apr. 2001, pp. 285-295.

Jian Tang, et al, LINE: Large-Scale Information Network Embedding, WWW 2015, May 18-22, 2015, Florence, Italy, pp. 1067-1077.

Cheng Yang, et al, Fast Network Embedding Enhancement via High Order Proximity Approximation, Proceedings of the Twenty-Sixth International Joint Conference on Artificial Intelligence (IJCAI-17), Melbourne, Australia, pp. 3894-3900.

Yu Zhang and Qiang Yang, A Survey on Multi-Task Learning, Department of Computer Science and Engineering, Hong Kong University of Science and Technology, Hong Kong, China, Jul. 2017, pp. 1-20.

Chang Zhou, et al, Scalable Graph Embedding for Asymmetric Proximity, AAAI'17: Proceedings of the Thirty-First AAAI Conference on Artificial Intelligence, San Francisco, California, Feb. 2017, pp. 2942-2948.

* cited by examiner

JOB TRANSITION DIRECTED GRAPH CONSTRUCT PROCESS 500

REPRESENT EACH PAIR-WISE JOB POSITION AS A VERTICE AND EACH JOB-TO-JOB TRANSITION AS EDGE 502

INTEGRATE EACH JOB SEEKER'S DIRECTED GRAPH $g$ INTO A CONSOLIDATED DIRECTED GRAPH $G$ INCLUDING WEIGHTING EDGES 504

NORMALIZE WEIGHTS 506

*FIG. 5*

ARTIFICIAL INTELLIGENCE JOB RECOMMENDATION NEURAL NETWORK MACHINE LEARNING TRAINING BASED ON EMBEDDING TECHNOLOGIES AND ACTUAL AND SYNTHETIC JOB TRANSITION LATENT INFORMATION

CROSS-REFERENCE TO RELATED APPLICATION

This application claims the benefit under 35 U.S.C. § 119(e) and 37 C.F.R. § 1.78 of U.S. Provisional Application No. 62/882,340, filed Aug. 2, 2019, which is incorporated by reference in its entirety.

FIELD OF THE INVENTION

The present invention relates in general to the field of machine learning, and more specifically to artificial intelligence job recommendation neural network machine learning training based on embedding technologies and actual and synthetic job transition latent information.

DESCRIPTION OF THE RELATED ART

Recommender engines receive input data and provide a recommendation output. Recommender engines have been applied in the context of job search engines that receive job employment opportunity inquiries from job seekers and provide one or more job recommendations. Although many employers may have job openings, only a subset of the employers offer a job that is suitable for the job seeker based on the features of the job and the job seeker.

To determine if a job is suitable for a particular job seeker, the job recommender engine receives relevant personal information about the job seeker, such as education and employment history, and other features that may be relevant in identifying one more job opportunities suitable for the job seeker. The relevant personal information is often included in an uploaded resumé of the job seeker. The relevant personal information can be extracted from the resumé and made available to the job recommender engine. The recommendation engine then utilizes the relevant personal information and attempts to match the relevant personal information with job requirements of a job provider and provide matches as a job recommendation to the job seeker and/or the job provider.

Often the number of job seekers and job positions available number in the hundreds of thousands or more. Accordingly, the foregoing process can result in hundreds or thousands of matches between job seekers and job providers. Thus, making a reasonable number of job recommendations based on the matches can be difficult and potentially arbitrary. Furthermore, existing unsupervised job recommender systems focus on preserving job description similarities and making job recommendations for jobs that simply have descriptions similar to each other or similar to the job seeker's current job. This works to some extent for job recommendations because for most job seekers, recommending a job similar to a job seeker's current job or recently applied jobs is usually reasonable. However, for many job seekers, other factors may be important.

SUMMARY

In at least one embodiment, a method of artificial intelligence job recommendation generation with machine learning training based on embedding technologies and actual and synthetic job position related training data includes generating a collective directed graph G having vertices for each job position and edges for each job position-to-job position transition derived from actual job data of multiple job seekers. The method further includes determining probabilistic job position-to-job position transitions between vertices of the collective directed graph G to expose latent job position-to-job position transition trends and generating synthetic job position-to-job position transition machine learning training data from subsets of the vertices and edges of the collective directed graph G. The method also includes applying at least one machine learning process to the collective directed graph G of actual data and synthetic training data to embed the collective directed graph G and synthetic training data as vectors in a vector space that preserves asymmetric job position-to-job position transitions included in the collective directed graph G and synthetic training data. The method further includes optimizing values of job position nodes in the vector space, receiving job position-to-job position transition data for a first job seeker, and classifying the job position-to-job position transition data for the first job seeker with the optimized, job-to-job transition vector space to predict one or more job transitions for the job seeker. The method additionally includes providing a least a subset of the predicted one or more job transitions to a job recommender engine to at least assist the job recommender engine in generating one or more job recommendations for the job seeker.

In at least one embodiment, a tangible, non-transient computer readable medium includes code stored therein, and the code is executable by the one or more processors to perform the foregoing method.

In at least one embodiment, an apparatus includes an artificial job recommender system that includes a neural network to generate job recommendations using machine learning training based on embedding technologies and actual and synthetic job position related training data. The artificial job recommender system includes one or more processors and one or more tangible storage mediums that include code stored therein, wherein the code is executable by the one or more processors to perform:
- generating a collective directed graph G having vertices for each job position and edges for each job position-to-job position transition derived from actual job data of multiple job seekers;
- determining probabilistic job position-to-job position transitions between vertices of the collective directed graph G to expose latent job position-to-job position transition trends;
- generating synthetic job position-to-job position transition machine learning training data from subsets of the vertices and edges of the collective directed graph G;
- applying at least one machine learning process to the collective directed graph G of actual data and synthetic training data to embed the collective directed graph G and synthetic training data as vectors in a vector space that preserves asymmetric job position-to-job position transitions included in the collective directed graph G and synthetic training data;
- optimizing values of job position nodes in the vector space;
- receiving job position-to-job position transition data for a first job seeker;
- classifying the job position-to-job position transition data for the first job seeker with the optimized, job-to-job transition vector space to predict one or more job transitions for the job seeker; and providing a least a subset of the predicted one or more job transitions to a job recommender engine to at least assist the job recommender engine in generating one or more job recommendations for the job seeker.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 depicts a job transition directed graph construction process.

DETAILED DESCRIPTION

Figure 1:
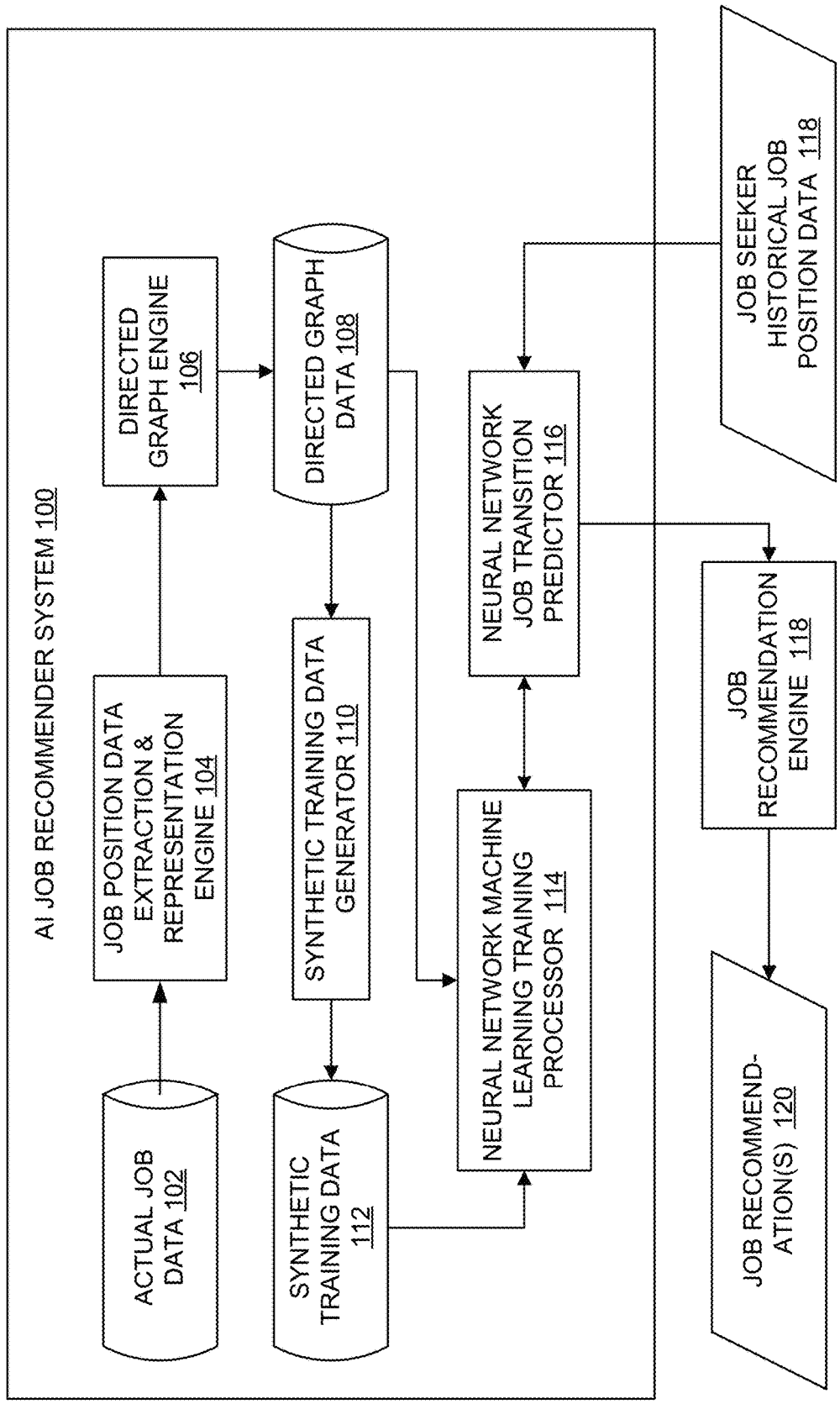
FIG. 1 depicts an exemplary AI job recommender system.

Machines and processes configured to develop neural network training data and provide artificial intelligence to predict job transitions and provide job recommendations to job seekers represent valued technology. In at least one embodiment, an artificial intelligence (AI) job recommender system and method implement neural network machine learning by generating and utilizing actual and synthetic training data to identify, learn, and apply latent job-to-job transition information and trends to improve job recommendations. For example, the AI job recommender system can learn and intelligently identify latent information, such as job position-to-job position transition trends, to provide a job recommendation that does not rely on simply matching similarities between a job seeker's current or applied job with available job positions. The broad concept of machine learning relates to training machine systems and processes to make decisions based on processes that improve over time. The artificial intelligence job recommender system and methods represent technological advances that, for example, identify data representations, identify multiple instances of latent information in actual data, develop synthetic training data from subsets and/or supersets of actual collective job position and job position-to-job position transitions, create a directed graph from latent, directional information, embed the directed graph into a vector space, and apply machine learning algorithms to technologically advance and transform a machine into a specialized machine that learns and improves job recommendations across the vector space.

In at least one embodiment, the AI recommender system represents job position information and derives latent, job position-to-job position transition information. In at least one embodiment, the AI job recommender system and method generates job position-to-job position transition directed graphs to preserve both job position information and job position-to-job position transition directional information, derives positive and negative, actual and synthetic directional data, and utilizes machine learning to embed job position-to-job position transition positive, negative, and synthetic vectors into a vector space. In at least one embodiment, the job position-to-job position transitions represent latent data derived from historical employment information such as information provided in job seekers' resumés that includes one or more job positions and corresponding employment dates. The particular representation of the latent job position-to-job position transition information is a matter of design choice. For example, job title, company pairs (referred to herein as a "job position") can capture not only similarity relations between jobs but also ordering relations among job positions, such as entry level to mid-level to senior level positions and can be represented by vertices in the directed graph. The job position-to-job position transition direction can be represented by edges in the directed graph.

In at least one embodiment, the AI job recommender system and method preserves job position-to-job position transitions in a directed graph. The directed graph represents job positions as vertices and directional job position-to-job position transitions as edges derived from the job seeker's job transition history in the job seeker's resumé data. Using machine learning, the AI job recommender system and method is trained by embedding actual and synthetic job position vertices and edges into a vector space using an asymmetric relationship preserving graph embedding algorithm. The asymmetry reflects that job position transitions are one way; although, job position transitions can be one way in both directions if a job seeker has returned to a former job position.

In general, AI systems include neural networks that utilize machine learning based on processing training data. However actual training data can be sparse. In at least one embodiment, the AI job recommender system and method augments actual job position and job position-to-job position transition training data with synthetic data. In at least one embodiment, the AI job recommender system and method generates synthetic job positions and job position-to-job position transition training data from subsets and/or supersets of actual job position and job position-to-job position transition information. For example, from an actual job transition sequence of job position 1 to job position 2 to job position 3, the AI job recommender system and method can generate two synthetic job position transitions, i.e. job position 1-to-job position 2 and, separately job position 2 to job position 3. Additionally, in at least one embodiment, the AI job recommender system and method develops other synthetic data, such as synthetic job positions that are not reachable based on actual job position-to-job position transition data. Experimental results on a career move prediction task using a real-world and synthetic data set demonstrate that the proposed embedding solution can technologically outperform state-of-the-art embedding methods as evaluated by, for example, a comparison of predicted results with actual results.

Furthermore, in at least one embodiment, the AI job recommender system and method embeds the directed graph of actual and synthetic data and embeds positive, negative, and synthetic data into a vector space to provide additional technical advantages, including improving computational performance. The advanced development of synthetic data enhances the machine learning of the AI job recommender and method neural network to improve learning and, thus, accuracy of job recommendations.

Figure 2:
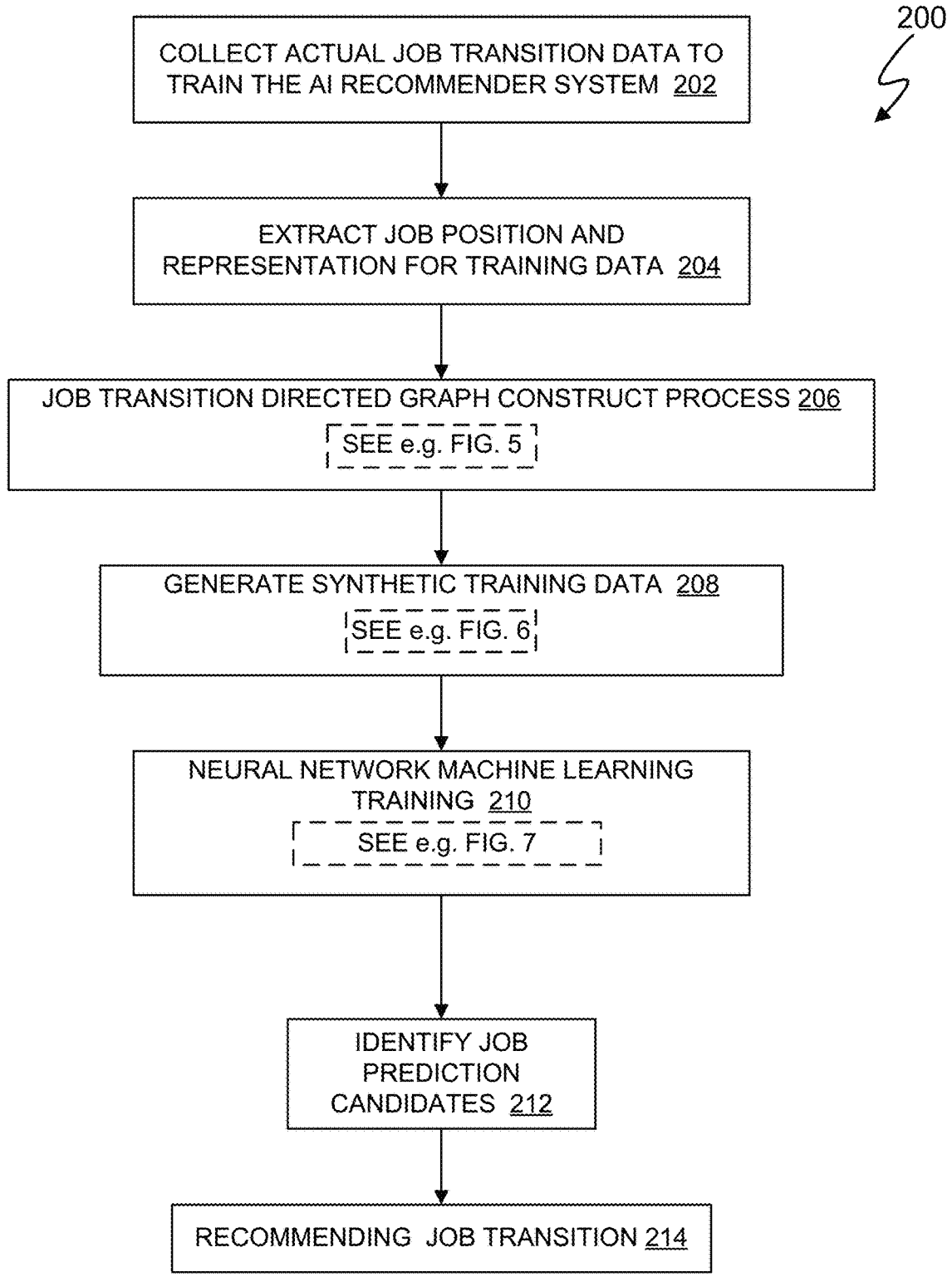
FIG. 2 depicts an exemplary AI job recommender process.
Figure 3:
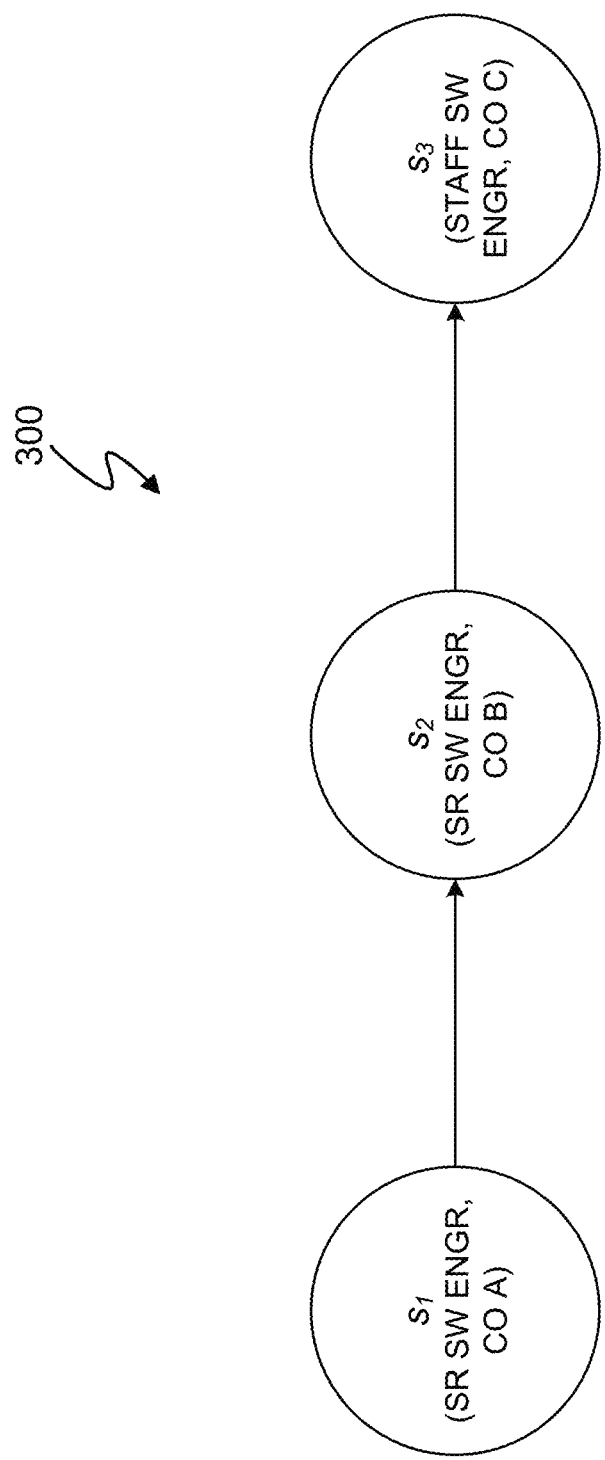
FIG. 3 depicts a directed graph 300 representing an exemplary pair-wise representation of an individual job seeker's three job positions.

FIG. 1 depicts an exemplary AI job recommender system 100. FIG. 2 depicts an exemplary AI job recommender process 200, and, in at least one embodiment, the AI job recommender system 100 operates in accordance with the AI job recommender process 200. In at least one embodiment, the AI job recommender system 100 constructs a 'job position-to-job position transition' directed graph with nodes representing job positions and directed edges representing weighted transitions. For computational purposes, the AI job recommender system 100 embeds the node and edge data into a vector space and preserves job position-to-job position transition directional information. FIG. 3 depicts an exemplary representation of a job position-to-job position directed graph 300. The job position data in the directed graphs includes both actual job position data and synthetic job position data derived from the actual job position data.

Referring to FIGS. 1 and 2, in operation 202, the AI job recommender system 100 collects actual job transition training data 202 and stores historic employment information including job positions. The AI job recommender system 100 derives job position-to-job position transition data from the job positions and associated employment dates indicated in the historic employment information contained in the actual job data 102. The job position-to-job position transition data is inferred by the AI job recommender system 100, and the AI job recommender system 100 machine-learns job position-to-job position transition trends by training with actual and synthetic training data. The trends represent an example of machine learned, latent information. The actual job data 102 can be stored in any format, such as in a database or in a structured markup language, such as XML. In at least one embodiment, the actual job data 102 represents job position and derived job position-to-job position transition data scraped from job seeker resumés submitted via an online job search site. For example, in at least one embodiment, the AI job recommender system 100 receives actual job position and job position-to-job position transition data based on associated employment dates from parsed resumés of actual job applicants and stores the data as actual job data 102. In operation 204, the job position data extraction and representation engine 104 job position information and preserves job ordering information. In at least one embodiment, the job position data extraction and representation engine 104 extracts pair-wise preference ordering information from the job transition training data 202 resulting from career choices indicated in the resumés. For example, in certain industry cycles, engineers can be more likely to switch jobs from hardware companies to software companies rather than from software companies to hardware companies. Additionally, for a job seeker, the job position of his/her early year experience is likely to be quite different from his/her current job position. In at least one embodiment, if the AI job recommender system 100 processed all job positions in the same resumé equally, embedding vectors that should be apart from each other are brought closer together, which can degrade the quality of the job position representation.

In operation 206, the directed graph engine 106 constructs job position-to-job position transition directed graphs from the extracted job position data and stores the directed graph data in storage 108, such as a database or other type of structured data format such as XML. Referring to FIG. 3, the directed graph 300 depicts an exemplary pair-wise representation of an individual job seeker's three job positions $s_1$, $s_2$, and $s_3$. The job positions $s_1$, $s_2$, and $s_3$ are (job title, company) pairs extracted from the employment history of the job seeker's resumé and the directional ordering is based associated employment dates. In addition to job positions, the directed graph 300, the asymmetric job position-to-job position transition is machine-learned by the AI job recommender system 100 to indicate a job position preference order for each pair of job positions, i.e. $s_1$-to-$s_2$-to-$s_3$, which can also be represented as $s_1 \rightarrow to \rightarrow s_2 \rightarrow s_3$. The exemplary job position pair-wise data in the directed graph 300 represents career transitions of a job seeker from job position $s_1$ (Senior Software Engineer, Company A)-to-job position $s_2$ (Senior Software Engineer, Company B)-to-job position $s_3$ (Staff Software Engineer, Company C). The particular representation of job position data is a matter of design choice, and, in at least one embodiment, is represented by pair-wise data set, e.g. job title, company, obtained from resumés with asymmetric transitions. There are various additional ways for operation 206 to represent job position-to-job positions and transitions including using tuples or even more expansive data sets. For example, locations can be another factor contributing to a job seeker's decision to change job positions and can be represented as a tuple, for example, (title, company, location). However, in most situations, the "company" data implies the location information, since a given company often has a limited number of working locations.

Figure 4:
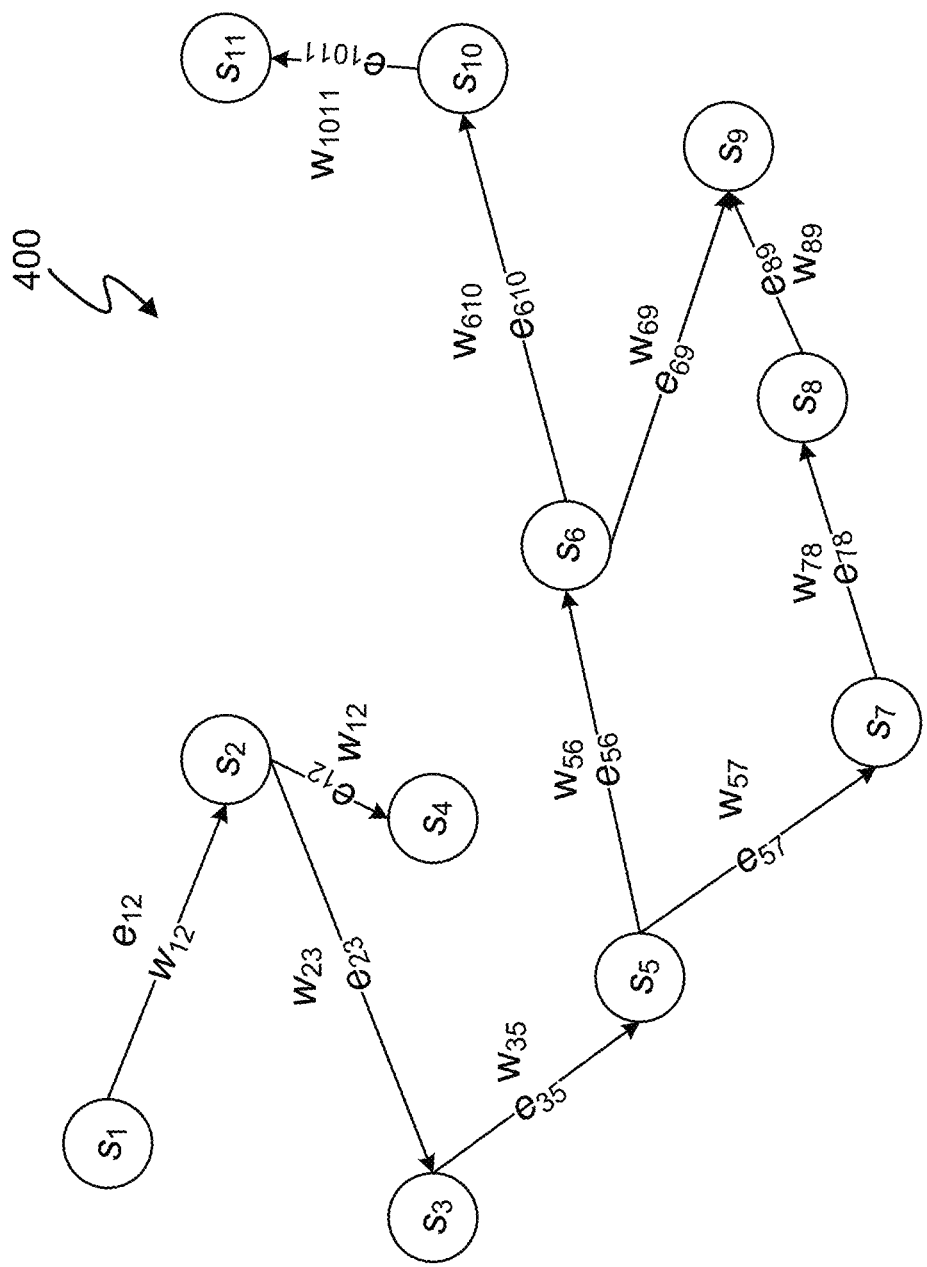
FIG. 4 depicts a directed graph of job positions and directional edges.

FIG. 4 depicts a directed graph 400, and FIG. 5 depicts an embodiment of operation 206. The directed graph 400 consolidates each job seeker's individual directed graph g into a collective job position-to-job position transition directed graph G such as directed graph 400. "G" represents the collective vertices V and edges E of any job position-to-job position directed graph, where $g \in G$. In at least one embodiment, the directed graph G consolidates like vertices and edges from each directed graph g of each job seeker. (Directed graph 300 represents one exemplary embodiment of a directed graph g from a job seeker.) Accordingly, G=(V, E) represents the consolidated directed graphs from sets of job seeker historical job transition data present in actual job data 102 and synthetic data derived therefrom as, for example, subsequently discussed, where V represents the set of all vertices in G, and E represents the set of all edges in G. In at least one embodiment, the AI job recommender system 100 does not generate a separate, stand-alone directed graph g for each job seeker, i.e. does not actually consolidate each directed graph g of the job seekers into the collective directed graph G. In at least one embodiment, the AI job recommender system 100 generates the collective directed graph G by including a unique vertice in the collective directed graph G for each unique job position and weights each edge in accordance with the number of job position-to-job position transitions from vertice to vertice represented by the collective job position-to-job position transition information present in the actual job data 102. For example, if job seeker A has job positions and job position-to-job position transitions of $s_1 \rightarrow to \rightarrow s_2 \rightarrow s_3$ and job seeker B has job positions and job position-to-job position transitions of $s_2 \rightarrow s_3 \rightarrow s_4$, then AI job recommender system 100 creates four unique vertices, one each for job positions $s_1$, $s_2$, $s_3$, and $s_4$ -and weighted edges that reflect two transitions from vertice s2 and one transition from vertices $s_1$ and $s_3$.

Referring to FIGS. 1, 4, and 5, in operation 502, the AI job recommender system 100 represents each vertice s as the job position, i.e., (job title, company) and represents each edge e as a job transition (i.e. a job position-to-job position transition), where $s \in V$ and $e \in E$. (Note, a "vertice" can also be referred to as a "node."). Accordingly, the historical employment history of each resumé and each derived synthetic path are paths on directed graph G. For example, the directed graph 300 for actual job seeker A data has three job positions $s_1$, $s_2$, and $s_3$ (vertices) and two transitions $e_{12}$ and $e_{23}$ (edges), representing the job position-to-job position transitions $s_1$-to-$s_2$-to-$s_3$. Job seekers often have complete or partial overlapping job positions with other job seekers. In operation 504, the AI job recommender system 100 integrates job seeker A's directed graph and other directed graphs (not shown) of job seekers' job position and job position-to-job position transition data sets into the collective directed graph 400 for multiple job seekers. Common job positions and job position-to-job position transitions among the job seekers' directed graphs are represented by common, respective vertices and edges.

In at least one embodiment, operation 504 represents a quantity of common edges among the job seeker's directed graphs by weighting edges with weights $w_{ij}$ representing the frequency of each particular job position-to-job position transitions, i.e. each vertice to vertice transition in the directed graph 400). Weights $w_{ij}$ represents the transition frequency from vertice i to vertice j for all vertices in directed graph 400. For example, 10,000 other job seekers have a job position-to-job position transition, directed graph component of $s_1$-to-$s_2$, including the first job position-to-job position transition of job seeker A. Thus, for edge $e_{12}$, the weight $w_{12}$=10,000. Thirty thousand job seekers have a job position-to-job position transition directed graph component of $s_2$-to-$s_3$, which also includes the second job position-to-job position transition of job seeker A. Thus, for edge $e_{23}$, the weight $w_{23}$=30,000. Fifty thousand job seekers have a job position-to-job position transition directed graph component of $s_3$-to-$s_5$. Thus, for edge $e_{35}$, the weight $w_{35}$=50,000. Twenty five thousand job seekers have a job position-to-job position transition directed graph component of $s_5$-to-$s_6$. Thus, for edge $e_{56}$, the weight $w_{56}$=25,000, and so on. In at least one embodiment, in operation 506, AI job recommender system 100 normalizes each weight $w_{ij}$ to obtain a job position-to-job position transition (vertice to vertice) transition probability $p_{ij}$ in accordance with Equation 1:

$$p_{ij} = \frac{w_{ij}}{\sum_{j \in U_i} w_{ij}} \quad \text{Equation 1}$$

where $U_i$ is the set of vertices reachable from $s_i$ in 1 transition step. The process of determining whether a job position (vertice) in one resumé is equivalent to a job position in another resumé is a matter of design choice. In at least one embodiment, AI job recommender system 100 determines two job positions to be similar when job seekers are very likely to move from one job position to another and vice versa (first-order proximity). The AI job recommender system 100 also determines higher order similarities such as when many job seekers moved to/from a set of jobs from/to the similar, first-order proximity job. In at least one embodiment, the edge weights $w_{ij}$ and vertice i to vertice j transition probabilities $p_{ij}$ assist the AI job recommender system 100 in learning job position-to-job position transition trends preference ordering and job position-to-job position transition ranking. Classifying the job position-to-job position transition data for the first job seeker with the optimized, job-to-job transition vector space to predict one or more job transitions for the job seeker in accordance with each transition probability $p_{ij}$ so that higher transition probability $p_{ij}$ indicate a higher likelihood and higher preference job transition.

The AI job recommender system 100 also includes a synthetic training data generator 110 to generate additional training data for a neural network job transition predictor 112. The actual job position-to-job position transitions represented in the actual job data 102 provides training data for the neural network job transition predictor 112. However, in at least one embodiment, additional training data improves performance of the neural network job transition predictor 112. To create additional training data, in operation 208, the synthetic training data generator 110 generates synthetic training data. In at least one embodiment, the synthetic training data generator 110 generates three types of synthetic training data: (1) Positive synthetic training data based on the actual job data 102, (2) Negative, randomly generated training data from job position-to-job position transitions that are unreachable in the actual job data 102, and (3) Negative synthetic data based on the actual job data 102.

Figure 6:
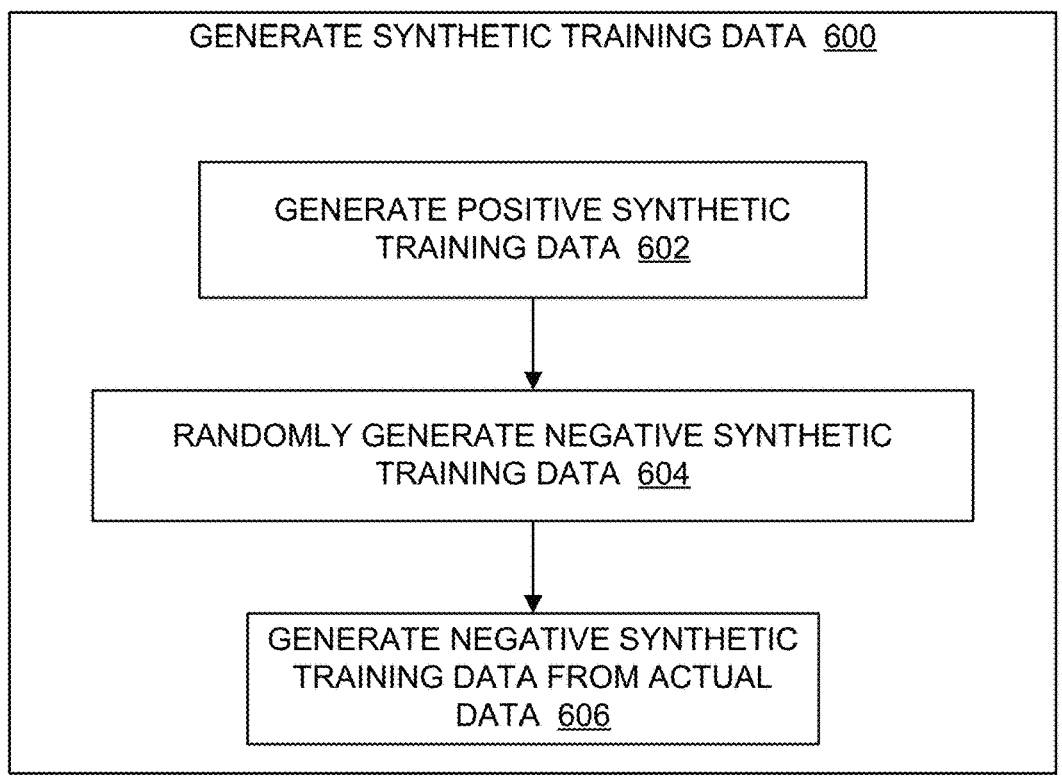
FIG. 6 depicts a synthetic training data generation process.

FIG. 6 depicts a synthetic training data generation process 600, which represents one embodiment of operation 208. Referring to FIGS. 2 and 6, in operation 602, the synthetic training data generator 110 generates positive synthetic training data by sampling the nodes and edges from the directed graph G of actual job data 102. For a given path on directed graph G, operation 602 generates the positive training samples by collecting all pairs of nodes following a positive transition order. For example, referring to directed graph 400 representing an exemplary directed graph G that includes directed graph 300, in operation 602, a job position path of $s_1$-to-$s_2$-to-$s_3$ from directed graph 300 yields three synthetic, positive job position transition pairs $s_1$-to-$s_2$, $s_1$-to-$s_3$, and $s_2$-to-$s_3$. Assuming job position-to-job position transition $s_3$-to-$s_5$-to-$s_6$ represents an actual job position-to-job position transition from actual job data 102, operation 602 generates three additional synthetic, positive job position transition pairs $s_3$-to-$s_5$, $s_5$-to-$s_6$, and $s_5$-to-$s_6$. Furthermore, assuming if $s_1$-to-$s_2$-to-$s_3$-to-$s_4$ does not represent actual historical job data, job position-to-job position transitions $s_1$-to-$s_2$-to-$s_3$-to-$s_4$ also represent positive synthetic data, and so on. The dimensions (i.e. the number of vertices) of the synthetic training data can be less than, equal to, or greater than the dimensions of any one directed graph g in the collective, actual training data directed graph G. In reality, the number of job position-to-job position transitions is not limitless. Accordingly, in at least one embodiment, operation 602 conducts a random walk through the directed graph G of all actual job position-to-job position transitions represented in actual job data 102 with a stopping probability of γ. Additionally, in at least one embodiment, the probability of the random walk moving from job position $s_i$-to-$s_j$ is $p_{ij}$, which is the probability calculated in Equation 1. i and j are index values uniquely respectively representing each source node and each destination node in a job position-to-job position transition of each actual and synthetic training vector. The value of γ is a matter of design choice, and, in at least one embodiment, γ is set so that the average number of job position-to-job position transitions represented in the synthetic data equals an average number of job position-to-job position transitions by actual job seekers. The particular number of average transitions can vary depending on context. For example, the average number of transitions can vary by industry. In at least one embodiment, the value of γ is any value from 3 to 6.

In operation 604, the synthetic training data generator 110 randomly generates negative synthetic training data. To randomly generates negative synthetic training data, for each positive training sample $s_i$-to-$s_j$, operation 604 randomly creates K nodes not reachable from $s_i$ in any path of directed graph G, e.g. negative, randomly generated training data from job position-to-job position transitions that are unreachable in the actual job data. K is an integer that approximately equals a number of positive job position-to-job position transitions.

In operation 606, the synthetic training data generator 110 generates negative synthetic training data from actual job data 102. To generate the negative synthetic training data, operation 606 performs a truncated, reverse random walk starting from node $s_i$ and following a reverse direction of edges. Any node on the ensuing, reverse path is added as a negative component of a sample of negative synthetic training data. In at least one embodiment, the same stopping probability γ is used in the reverse random walk to control how many nodes are included in each sample of negative synthetic training data. Referring to directed graph 400, examples of negative synthetic training data are $s_3$-to-$s_2$-to-$s_1$, $s_4$-to-$s_3$-to-$s_2$-to-$s_1$, $s_{11}$-to-$s_{10}$, and so on. The synthetic training data generator 110 stores the synthetic training data in synthetic training data 112 as, for example, a database or structured markup language.

Figure 7:
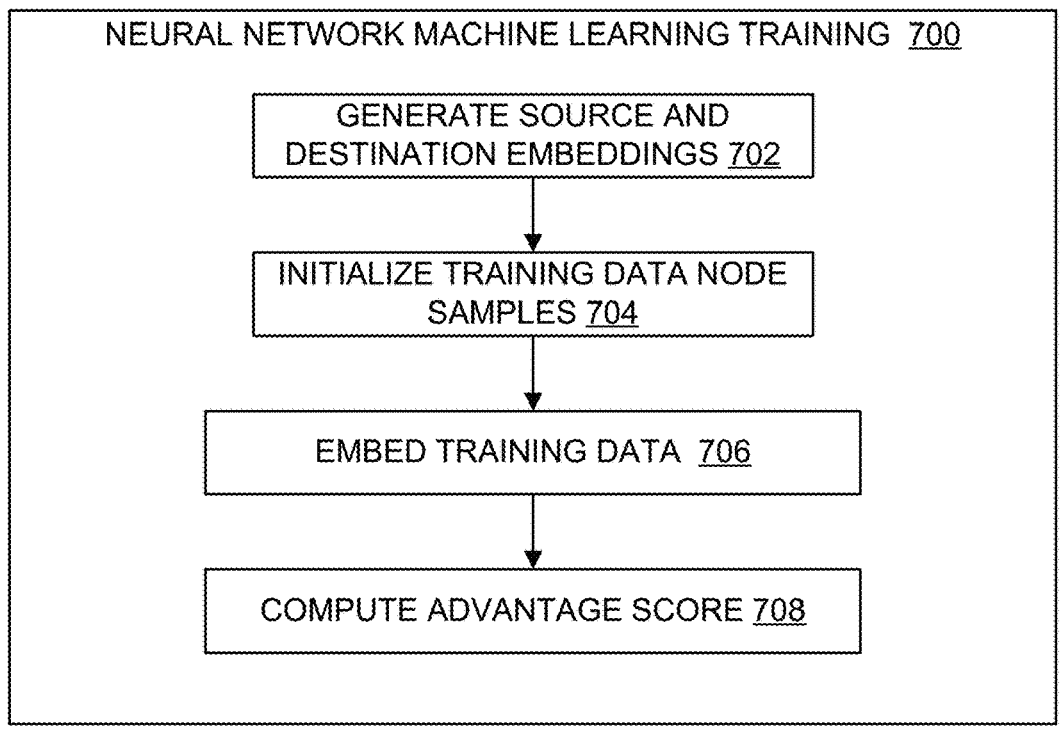
FIG. 7 depicts a neural network machine learning training process.

The AI job recommender system 100 also includes a neural network machine learning processor 114 that operates in accordance with the neural network machine learning training process 210 in FIG. 2. FIG. 7 depicts a neural network machine learning training process 700, which represents an exemplary embodiment of the neural network machine learning training process 210. Referring to FIGS. 1 and 7, operation 702 generates a source node u and destination node v embedding for each job position $s_i$. When considering directional, vertice-to-vertice job transitions in a directed graph G, for any given direction, a job position $s_i$ can act as a transition source or destination. The asymmetric transitivity preserving graph embedding algorithm of operation 600 computes (a) a source node embedding $u_i$ and a destination node embedding $v_i$ for job position $s_i$ for actual and synthetic nodes and (b) a source node embedding $u_j$ and a destination node embedding $v_j$ for job position $s_j$ for each job position $s_i$-to-job position $s_j$ transition for actual and synthetic nodes, wherein i is an index value uniquely representing each node of each actual and synthetic training vector. Operation 704 initializes the values of each of embedded node $u_i$, $v_i$, $u_j$, and $v_j$. In at least one embodiment, the initialization values are random values.

Operation 706 optimizes a machine learning cost function to determine the embedding values of $u_i$, $v_i$, $u_j$, and $v_j$. Equation 2 represents an exemplary cost function:

$$\text{Cost Function} = \log\sigma(u_i \cdot v_j) + \sum_{s_k \in U_{neg,i}} \log\sigma(-u_i \cdot v_k) \quad \text{Equation 2}$$

where:

$U_{neg,i}$ is the set of nodes in directed graph G sampled to make negative synthetic training pairs for node $s_i$;

$$\sigma(x) = \frac{1}{1 + e^{-x}}$$

is the sigmoid function;

$u_i$ represents a source node for job position $s_i$;

$v_j$ represents a destination node for job position $s_j$; and $v_k$ represents a destination node embedding for job position $s_k$, and job position $s_k$ cannot be reached from job position $s_i$.

In operation 706, optimizing the cost function of Equation 2 brings an output embedding of job position $s_j$ close to an input embedding of job position $s_i$, if $s_j$ can be reached from $s_i$ in the actual directed graph G data or synthetic training data paths. On the other hand, an output embedding of job position $s_k$ will be moved away by the optimization of Equation 2 from input embedding of job position $s_i$ if job position $s_i$ cannot be reached from job position $s_k$ in the sample paths. In at least one embodiment, $v_k$ represents a destination node embedding for job position $s_k$, and job position $s_k$ cannot be reached from job position $s_i$.

The neural network machine learning processor 114 obtains the cost function of Equation 2 by summing Equation 2 over all positive pairs from actual and synthetic training data paths. The neural network machine learning processor 114 then optimizes the cost function of Equation 2 using, for example, a stochastic gradient descent (SGD) to minimize or approximately minimize the value of Equation 2. The neural network machine learning processor 114 selects the values of variables in Equation 2 that minimize Equation 2 as the embedded values for $u_i$, $v_i$, $u_j$, and $v_j$. The particular gradient descent factor is a matter of design choice with relatively larger number providing a more aggressive learning rate. An exemplary gradient descent factor is equal to or between 0.1 and 2. Embedding the actual job data and into the vector space preserves the asymmetric transitivity. In at least one embodiment, the cost function can be calculated from summing up Equation 2 over all positive pairs from sample paths. It is then optimized using the stochastic gradient descent.

The following represents pseudocode for determining the embedding for each node $s_i$:

---

Input : Graph G = (V , E) constructed from user resumé data,
  stopping factor γ for the random walk, and learning rate λ
  representing the SGD factor. Output : embedding eu and ev for
       each node si ∈ V
    Initialize $u_i$, $v_i$, ∀$s_i$ ∈ V as random vectors;
  Each s ∈ V initialize training data set $U_p$, $U_n$ as an empty set,
       $U_p$ ← RandomWalk(s,γ)∪PairsFromResumés
       $U_n$ ← ReverseRandomWalk(s,γ)∪PairsFromResumés
              $U_s$ ← $U_p$∪$U_n$
   Training sample x ∈ $U_s$ Stochastic Gradient Descent(x)

---

Directed graph 400 and other likewise generated directed graphs from other employment history data represent the type of directed graphs embedded into the vector space. In at least one embodiment, the vector space is a low-dimensional vector space in which meaningful relations between nodes and structural information of the directed graph are captured and saved. With directed graph embedding, the AI job recommender system 100 effectively applies vector-based machine learning algorithms to the directed graph data and synthetic training data to train the neural network matching learning training processor 114.

Data categories other than (job title, company) can be embedded into the vector space for training the AI job recommender system 100. For example, job embeddings can be computed from co-click and/or co-apply data from a job seeker's interaction with a job application website. Co-click and/or co-apply data assumes that if two jobs are applied by the same person, the jobs should be similar to each other. Job embeddings can also be obtained from pooling or concatenating embeddings of skills, companies and job titles together if the supporting data is available. However, in general, comparing embeddings utilizing co-click and/or co-apply data with historical job position and job position-to-job position transitions, embedding a directed graph of historical job position and job position-to-job position transitions carries the additional information of, for example, job transitions, that comes from the underlying directed graph structure and is generally missing in the co-click or co-apply data. However, the historical job position and job position-to-job position transitions training data set from actual job data 102 is generally sparser.

In operation 708, the neural network job transition predictor 116 determines a job position-to-job position transition advantage score. Job position-to-job position transitions between job positions $s_i$ and $s_j$ can occur in both directions, which creates a cycle in the directed graph G. As discussed in more detail below, the advantage score can be used by AI job recommender system 100 to refine results of job transition predictions. The advantage score AS represents whether a transition from job position $s_i$ to job position $s_j$ is more likely than a job transition from job position $s_j$ to job position $s_i$. Operation 708 computes the advantage score of node $s_i$ over $s_j$ in accordance with Equation 3:

$$\text{Advantage Score AS} = u_i \cdot v_j - u_j \cdot v_i \qquad \text{Equation 3}$$

A positive advantage score AS means that more job seekers tend to move from job position $s_i$ to job position $s_j$ rather than the other way around. An advantage scores between a job position-to-job position transition pair summarizes the job seekers' preference as reflected in the job transition graph G. The advantage score AS refines the results of job position prediction. Thus, in at least one embodiment, an advantage score AS represents whether a transition from job position $s_i$-to-job position $s_j$ is more likely than a job transition from job position $s_j$-to-job position $s_i$. In at least one embodiment, the AI job recommender system 100 utilizes the advantage score AS to order the predicted one or more job transitions from a highest to lowest advantage score, and the AI job recommender system 100 selects the top N job positions for recommendation, where N is a positive integer, and the upper limit of N is a matter of design choice such as 3, 5, or 10. In at least one embodiment, the Advantage Scores for each job position-to-job position transitions are precomputed. In at least one embodiment, the Advantage Scores for each job position-to-job position transitions are computed on an as-needed basis.

The neural network job transition predictor 116. In at least one embodiment, in operation 212, the neural network job transition predictor 116 receives a job seeker's historical job position data 118 and classifies the job seeker's historical job position data by matching the job position-to-job position transitions represented in the job seeker's historical job position data with nodes in the optimized, job-to-job transition vector space to predict one or more job transitions for the job seeker. Then, the neural network job transition predictor 116 identifies each job position-to-job position transition in the vector space with each first job in the job position-to-job position transition being the most recent job position of the job seeker and the second job identified as a next job prediction candidate.

In at least one embodiment, particularly if the number of job prediction candidates exceed a predetermined threshold number, such as 10, the neural network job transition predictor 116 accesses the Advantage Score AS and selects the identified job prediction candidates with the 10 highest Advantage Scores.

In operation 214, the neural network job transition predictor 116 provides the selected job prediction candidates to a job recommendation engine 118. In at least one embodiment, the job recommendation engine 118 utilizes the provided job prediction candidates as input data to finalize and provide the job recommendation(s) 120 to the job seeker. In at least one embodiment, the job recommendation engine 118 considers additional factors, such as compensation, location, particular data about the job seeker, and so on to provide the job recommendation 118. In at least one embodiment, the neural network job transition predictor 116 controls the output of the job recommendation engine 118. The nature of the job recommendation(s) 120 provided to the job seeker by the job recommendation engine 118 is a matter of design choice. In at least one embodiment, the job recommendation engine 118 provides the job recommendation(s) 120 as static media, such as a text page and/or an image, and/or a multi-media file, such as a video.

Following is an example of the operations described above of embedding vectors for a software engineer at Company A and Company B, an Advantage Score AS, and actual and synthetic training data based on the directed graph 300:

Examples of Embedding Vectors:
 Software Engineer, Company A
  $u_1$=[−0.18199627, −0.06711098, 0.04306649, −0.13362714, −0.00823283, −0.12105915, −0.17250397, −0.04387575, −0.0038354, −0.13349195]
  $v_1$=[0.14696631, 0.05242663, −0.12528385, −0.01278522, 0.06601037, 0.01928127, 0.10515891, 0.13274701, −0.20349546, 0.11594722]
 Software Engineer, Company B
  $u_2$=[0.06163916, −0.0555102, 0.01673943, −0.10317189, 0.02300084, 0.1365082, 0.07613872, 0.02726548, −0.01507591, −0.02836214]
  $v_2$=[−0.05886782, 0.01284227, −0.05610673, −0.16604354, −0.0248277, 0.07625696, −0.07449336, −0.02134066, −0.01072389, −0.0436225]
 Advantage Score
  $u_1 v_2 - u_2 v_1$ = 0.0402−0.0209>0, which means that Software Engineer, Company A is more preferable than Software Engineer, Company B for job seekers, more people change job from Software Engineer at Company B to Software Engineer at Company A, not the reverse.

Generation Training Samples:
 Referring to directed graph 300 (FIG. 3), each node represents a job position:
 To generate training examples, we first collect all the resumes (both real and virtual), remember that each resume is a path on the graph, so we basically get a set of paths on the graph. If one of the job position-to-job position transition paths is $s_5 \rightarrow s_7 \rightarrow s_8$, then the AI job recommender system 100 obtains 3 positive training examples $(s_5, s_7)$, $(s_7, s_8)$ and $(s_5, s_8)$
 For each of these 3 positive examples, the AI job recommender system 100 also generates negative examples. For example, for $(s_7, s_8)$, AI job recommender system 100 can
  1. Generate negative examples by randomly sampling jobs not reachable from $s_7$. Such jobs are $(s_1, s_2, s_3, s_4, s_5, s_6, s_{10}, s_{11})$, suppose we sampled only one job from them, job $s_{10}$. Then $(s_7, s_{10})$ is a negative example.
  2. Generate negative examples by doing backwards truncated random walk (along reverse direction of edges)

from $s_7$. Suppose we walked 3 steps, getting a path $s_7 \to s_5 \to s_3$, then $(s_7, s_5)$, $(s_7, s_3)$, $(s_5, s_3)$ are the negative examples generated.

Then AI job recommender system 100 picks K (e.g. K=3) negative examples (by random sampling) from the negative examples generated above, ignoring duplicated ones if any.

Figure 8:
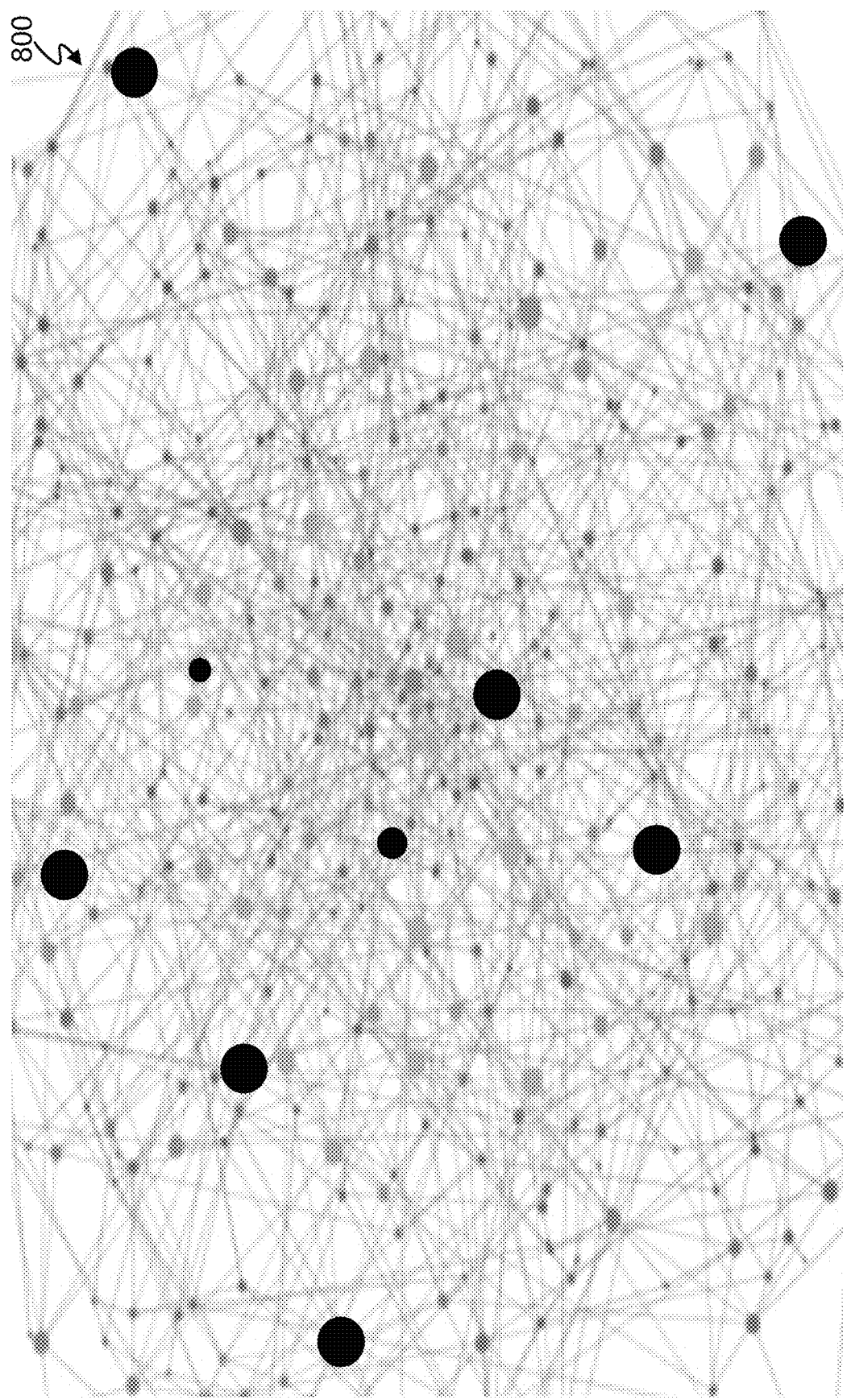
FIG. 8 depicts a more expansive directed graph of job positions and directional edges.

FIG. 8 represents a directed graph 800 that represents an expansive but very small fraction of job position vertices and edges in a large collection of job position-to-job position transitions. The number of job position vertices and edges can number into the tens of thousands, hundreds of thousand, or millions making it impossible to reasonably solve the job prediction problem mentally or by hand.

Figure 9:
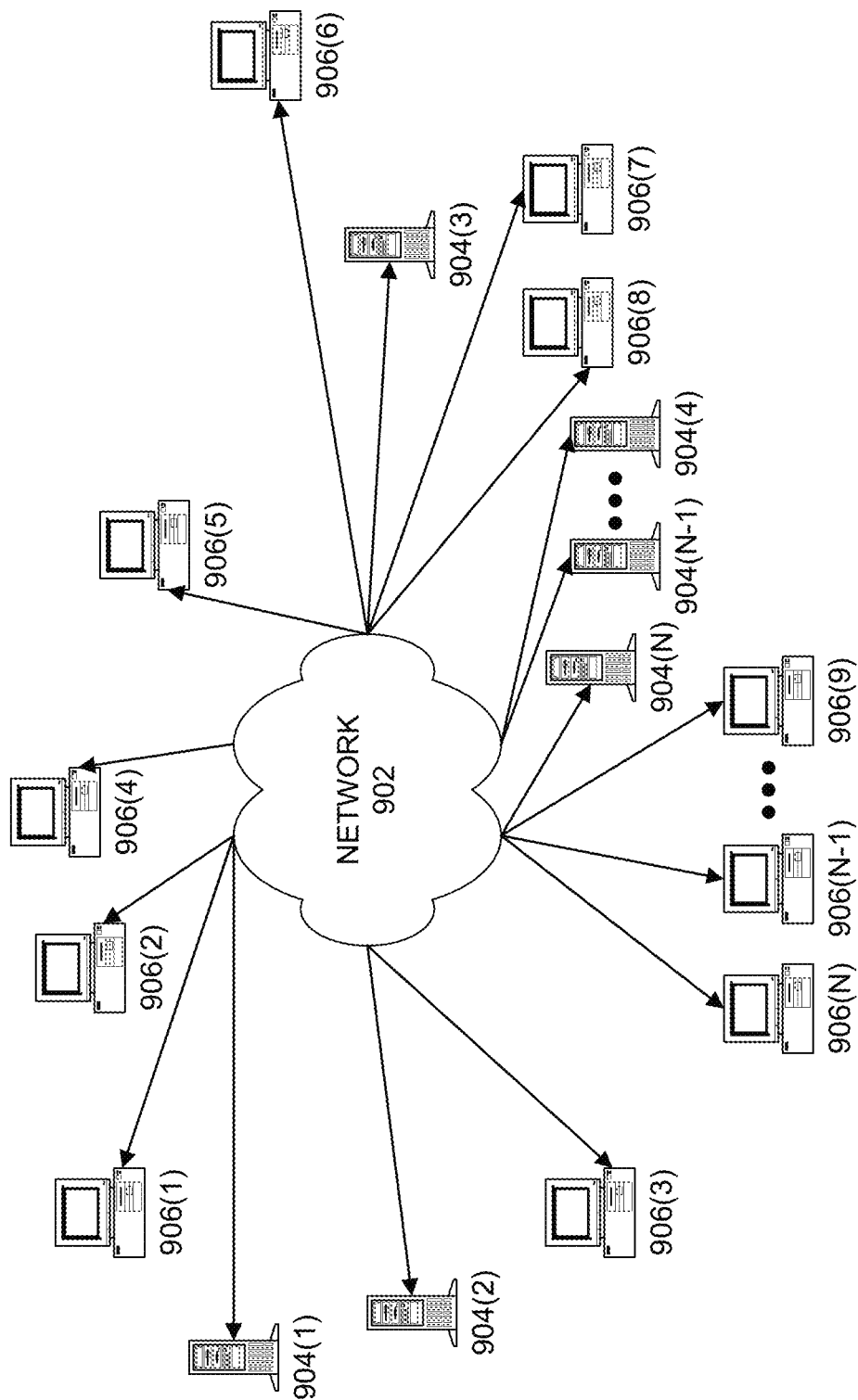
FIG. 9 depicts an exemplary network environment.

FIG. 9 is a block diagram illustrating a network environment in which an AI job recommender system 100 and AI job recommender process 200 may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the AI job recommender system 100 and AI job recommender process 200, the computer systems are specialized artificial intelligence machines with neural networks trained with actual and synthetic data. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the [name of system and/or process] can be implemented using code stored in a tangible, non-transient computer readable medium (also referred to as a computer program product), and executed by one or more processors. In at least one embodiment, the [name of system and/or process] can be implemented completely in hardware using, for example, logic circuits and other circuits including field programmable gate arrays.

Figure 10:
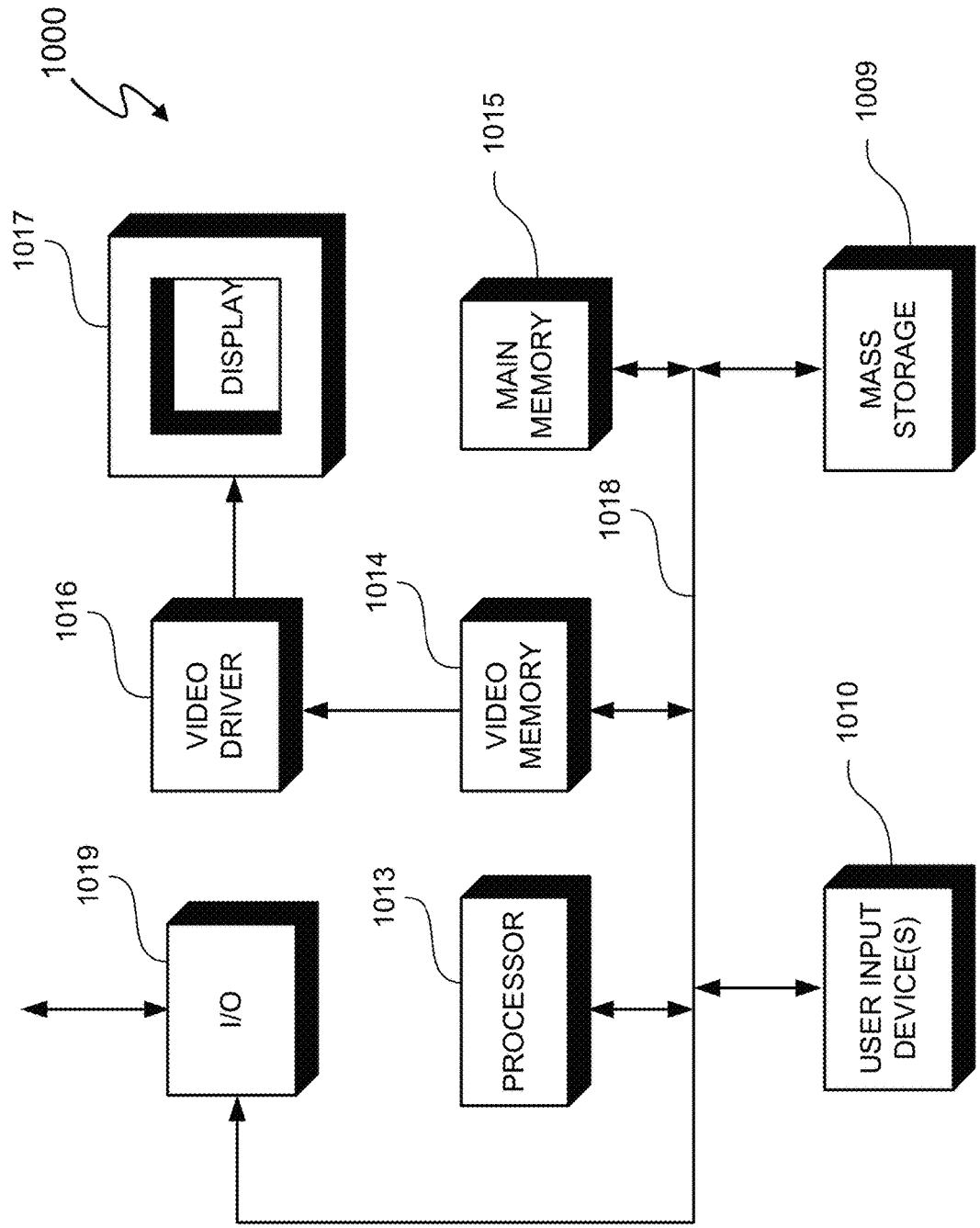
FIG. 10 depicts an exemplary computer system.

Embodiments of the AI job recommender system 100 and AI job recommender process 200 can be implemented on a computer system such as specialized computer 1000 illustrated in FIG. 10. The computer 1000 can be a dedicated computer system or a virtual, emulated system located in, for example, a cloud computing environment. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 generally also includes a non-transitory video memory 1014, non-transitory main memory 1015, and non-transitory mass storage 1009, all coupled to bi-directional system bus 1018 along with input user device(s) 1010 and processor 1013. The mass storage 1009 may include both fixed and removable media, such as a hard drive, one or more CDs or DVDs, solid state memory including flash memory, and other available mass storage technology. Bus 1018 may contain, for example, 32 of 64 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to a remote server computer systems via a telephone link or to the Internet via an ISP. I/O device(s) 1019 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1009, into main memory 1015 for execution. Web pages are, in at least one embodiment, created using hypertext markup language or other language compatible with one or more types of web browsers. In at least one embodiment, Java applets or any other technology is used with web pages to allow a user of a web browser to make and submit selections and allow a client computer system to capture the user selection and submit the selection data to a server computer system.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The AI job recommender system 100 and AI job recommender process 200 may be implemented as a special purpose computer system or programming or processing environment. It is contemplated that the AI job recommender system 100 and AI job recommender process 200 might be run on a stand-alone computer system, such as the one described above. The AI job recommender system 100 and AI job recommender process 200 might also be run from a server computer systems system that can be accessed by a plurality of client computer systems interconnected over an intranet network. Finally, the AI job recommender system 100 and AI job recommender process 200 may be run from a server computer system that is accessible to other computers over a network.

Although embodiments have been described in detail, it should be understood that various changes, substitutions, and alterations can be made hereto without departing from the spirit and scope of the invention as defined by the appended claims.

What is claimed is:

1. A method of artificial intelligence job recommendation generation with machine learning training based on embedding technologies and actual and synthetic job position related training data, the method comprising:
    generating a collective directed graph G having vertices for each job position and edges for each job position-to-job position transition derived from actual job data scraped from multiple job seeker resumes stored by an online job search site;
    determining probabilistic job position-to-job position transitions between vertices of the collective directed graph G to expose latent job position-to-job position transition trends;
    generating synthetic training data for machine learning training using subsets of the vertices and edges of the collective directed graph G, wherein the synthetic training data includes:
        positive synthetic training data generated by sampling the vertices and the edges of the collective directed graph G to collect pairs of the vertices connected by ones of the edges that follow a positive transition order;
        first negative synthetic training data generated by randomly creating, from samples of the positive synthetic training data, new vertices for the collective directed graph G that are unreachable from the vertices and the edges that are based on the actual job data; and
        second negative synthetic training data generated by performing a reverse random walk from each of multiple vertices of the collective directed graph G;
    applying at least one machine learning process to the collective directed graph G to embed the collective directed graph G and the synthetic training data as vectors in a vector space that preserves asymmetric job position-to-job position transitions included in the collective directed graph G and the synthetic training data;
    optimizing values of job position nodes in the vector space;
    receiving job position-to-job position transition data for a job seeker using the online job search site;
    classifying the job position-to-job position transition data for the job seeker with the optimized, job-to-job transition vector space to predict one or more job transitions for the job seeker; and
    providing at least a subset of the predicted one or more job transitions to a job recommender engine of the online job search site to at least assist the job recommender engine in generating, within the online job search site, one or more job recommendations for the job seeker.

2. The method of claim 1 wherein applying the at least one machine learning process to the collective directed graph G of the actual job data and the synthetic training data to embed the collective directed graph G and the synthetic training data further comprises:
    computing (a) a source node embedding $u_i$ and a destination node embedding $v_i$ for job position $s_i$ for actual and synthetic nodes and (b) a source node embedding $u_j$ and a destination node embedding $v_j$ for job position $s_j$ for each job position $s_i$-to-job position transition for actual and synthetic nodes, wherein i and j are index values uniquely and respectively representing each source node and each destination node in a job position-to-job position transition of each actual and synthetic training vector.

3. The method of claim 2 wherein applying the at least one machine learning process to the collective directed graph G of the actual job data and the synthetic training data to embed the collective directed graph G and synthetic training data further comprises:
    optimizing a machine learning cost function to determine the embedding values of $u_i$, $v_i$, $u_j$, and $v_j$.

4. The method of claim 2 wherein the machine learning cost function is computed in accordance with:

$$\text{Cost Function} = \log\sigma(u_i \cdot v_j) + \sum_{s_k \in U_{neg,i}} \log\sigma(-u_i \cdot v_k)$$

wherein:
$U_{neg,i}$ is a set of nodes in directed graph G sampled to make negative synthetic training pairs for node $s_i$; and $$\sigma(x) = \frac{1}{1+e^{-x}}$$

is the sigmoid function;
$u_i$ represents a source node for job position $s_i$;
$v_j$ represents a destination node for job position $s_j$; and
$v_k$ represents a destination node embedding for job position $s_k$, and job position $s_k$ cannot be reached from job position $s_i$.

5. The method of claim 2 further comprising:
initializing values of each of embedded nodes $u_i$, $-u_i$, $v_j$, and $v_k$ with random values.

6. The method of claim 1 further comprising:
generating a directed graph g of each job position and job position-to-job position transition of each job seeker from the actual job data;
wherein generating the collective directed graph G comprises:
    consolidating each directed graph g into the collective directed graph G and preserving job position information and job position-to-job position transition directional information in the actual job data.

7. The method of claim 1 further comprising:
identifying the at least one machine learning process latent job-to-job transition information and job position-to-job position transition trends to determine job recommendations.

8. The method of claim 1 wherein each job position represents a (job title, company) data pair.

9. The method of claim 1 further comprising:
training a neural network with the at least one machine learning process.

10. The method of claim 1 further comprising:
weighting edges of the directed graph G with weights $w_{ij}$ representing a frequency of each particular job position-to-job position transition from job $s_i$-to-job $s_j$, wherein i and j are index values uniquely respectively representing each source node and each destination node in a job position-to-job position transition of each actual and synthetic training vector;

normalizing each weight $w_{ij}$ to obtain a job position-to-job position transition (vertice to vertice) transition probability $p_{ij}$ in accordance with:

$$p_{ij} = \frac{w_{ij}}{\sum_{j \in U_i} w_{ij}}$$

wherein $U_i$ is a set of vertices reachable from $S_i$ in 1 transition step; and classifying the job position-to-job position transition data for the job seeker with the optimized, job-to-job transition vector space to predict one or more job transition for the job seeker in accordance with each transition probability $p_{ij}$ so that higher transition probability $p_{ij}$ indicate a higher likelihood and higher preference job transition.

11. The method of claim 1 further comprising:
refining the predicted one or more job transitions, wherein refining the predicted one or more job transitions comprises:
generating an advantage score representing whether a transition from job position $s_i$ to job position $s_j$ is more likely than a job transition from job position $s_j$ to job position $s_i$, wherein i and j are index values uniquely respectively representing each source node and each destination node in a job position-to-job position transition of each actual and synthetic training vector; and
utilizing the advantage score to order the predicted one or more job transitions from a highest to lowest advantage score. Preference to generate an advantage score; and
selecting a top N job positions for recommendation, where N is a positive integer.

12. The method of claim 11 wherein generating an advantage score comprises:
computing the advantage score of node $S_i$ over $s_j$ in accordance with:

Advantage Score $AS = u_i \cdot v_j - u_j \cdot v_i$.

wherein:
$u_i$ represents a source node for job position $s_i$;
$u_j$ represents a source node for job position $s_j$;
$v_i$ represents a destination node for job position $s_i$; and
$v_j$ represents a destination node for job position $s_j$.

13. A tangible, non-transient computer readable medium that includes code stored therein, wherein the code is executable by one or more processors to perform the method of claim 1.

14. An apparatus comprising:
an artificial job recommender system that includes a neural network to generate job recommendations using machine learning training based on embedding technologies and actual and synthetic job position related training data, the artificial job recommender system comprising:
one or more processors; and
one or more tangible storage mediums that include code stored therein, wherein the code is executable by the one or more processors to perform:
generating a collective directed graph G having vertices for each job position and edges for each job position-to-job position transition derived from actual job data scraped from multiple job seeker resumes stored by an online job search site;
determining probabilistic job position-to-job position transitions between vertices of the collective directed graph G to expose latent job position-to-job position transition trends;
generating synthetic training data for machine learning training using subsets of the vertices and edges of the collective directed graph G, wherein the synthetic training data includes:
positive synthetic training data generated by sampling the vertices and the edges of the collective directed graph G to collect pairs of the vertices connected by ones of the edges that follow a positive transition order;
first negative synthetic training data generated by randomly creating, from samples of the positive synthetic training data, new vertices for the collective directed graph G that are unreachable from the vertices and the edges that are based on the actual job data; and
second negative synthetic training data generated by performing a reverse random walk from each of multiple vertices of the collective directed graph G;
applying at least one machine learning process to the collective directed graph G to embed the collective directed graph G and the synthetic training data as vectors in a vector space that preserves asymmetric job position-to-job position transitions included in the collective directed graph G and the synthetic training data;
optimizing values of job position nodes in the vector space;
receiving job position-to-job position transition data for a job seeker using the online job search site;
classifying the job position-to-job position transition data for the job seeker with the optimized, job-to-job transition vector space to predict one or more job transitions for the job seeker; and
providing at least a subset of the predicted one or more job transitions to a job recommender engine of the online job search site to at least assist the job recommender engine in generating, within the online job search site, one or more job recommendations for the job seeker.

15. The apparatus of claim 14 wherein the code to perform applying the at least one machine learning process to the collective directed graph G of the actual job data and the synthetic training data to embed the collective directed graph G and the synthetic training data is further executable by the one or more processors to perform:
computing (a) a source node embedding $u_i$ and a destination node embedding $v_i$ for job position $s_i$ for actual and synthetic nodes and (b) a source node embedding $u_j$ and a destination node embedding $v_j$ for job position $s_j$ for each job position $s_i$-to-job position $s_j$ transition for actual and synthetic nodes, wherein i and j are index values uniquely and respectively representing each source node and each destination node in a job position-to-job position transition of each actual and synthetic training vector.

16. The apparatus of claim 15 wherein the code to perform applying the at least one machine learning process to the collective directed graph G of the actual job data and the synthetic training data to embed the collective directed graph G and synthetic training data is further executable by the one or more processors to perform:
optimizing a machine learning cost function to determine the embedding values of $u_i$, $v_i$, $u_j$, and $v_j$.

17. The apparatus of claim 15 wherein the machine learning cost function is computed in accordance with:

$$\text{Cost Function} = \log\sigma(u_i \cdot v_j) + \sum_{s_k \in U_{neg,i}} \log\sigma(-u_i \cdot v_k)$$

wherein:
$U_{neg, i}$ is a set of nodes in directed graph G sampled to make negative synthetic training pairs for node $s_i$; and $$\sigma(x) = \frac{1}{1+e^{-x}}$$

is the sigmoid function;
$u_i$ represents a source node for job position $s_i$;
$v_j$ represents a destination node for job position $s_j$; and
$v_k$ represents a destination node embedding for job position $s_k$, and job position $s_k$ cannot be reached from job position $s_i$.

18. The apparatus of claim 15 wherein the code is further executable by the one or more processors to perform:
initializing values of each of embedded nodes $u_i$, $-u_i$, $v_j$, and $v_k$ with random values.

19. The apparatus of claim 14 wherein the code is further executable by the one or more processors to perform:
generating a directed graph g of each job position and job position-to-job position transition of each job seeker from the actual job data;
wherein generating the collective directed graph G comprises:
consolidating each directed graph g into the collective directed graph G and preserving job position information and job position-to-job position transition directional information in the actual job data.

20. The apparatus of claim 14 wherein the code is further executable by the one or more processors to perform:
identifying the at least one machine learning process latent job-to-job transition information and job position-to-job position transition trends to determine job recommendations.

21. The apparatus of claim 14 wherein each job position represents a (job title, company) data pair.

22. The apparatus of claim 14 wherein the code is further executable by the one or more processors to perform:
training a neural network with the at least one machine learning process.

23. The apparatus of claim 14 wherein the code is further executable by the one or more processors to perform:
weighting edges of the directed graph G with weights $w_{ij}$ representing a frequency of each particular job position-to-job position transition from job $s_i$-to-job $s_j$, wherein i and j are index values uniquely and respectively representing each source node and each destination node in a job position-to-job position transition of each actual and synthetic training vector;
normalizing each weight $w_{ij}$ to obtain a job position-to-job position transition (vertice to vertice) transition probability $p_{ij}$ in accordance with:

$$p_{ij} = \frac{w_{ij}}{\sum_{j \in U_i} w_{ij}}$$

wherein $U_i$ is a set of vertices reachable from $S_i$ in 1 transition step; and
classifying the job position-to-job position transition data for the job seeker with the optimized, job-to-job transition vector space to predict one or more job transitions for the job seeker in accordance with each transition probability $p_{ij}$ so that higher transition probability $p_{ij}$ indicate a higher likelihood and higher preference job transition.

24. The apparatus of claim 23 wherein the code is further executable by the one or more processors to perform:
refining the predicted one or more job transitions, wherein refining the predicted one or more job transitions comprises:
generating an advantage score representing whether a transition from job position $s_i$ to job position $s_j$ is more likely than a job transition from job position $s_j$ to job position $s_i$ wherein i and j are index values uniquely and respectively representing each source node and each destination node in a job position-to-job position transition of each actual and synthetic training vector; and
utilizing the advantage score to order the predicted one or more job transitions from a highest to lowest advantage scorer preference to generate an advantage score; and
selecting a top N job positions for recommendation, where N is a positive integer.

25. The apparatus of claim 24 wherein the code to perform generating an advantage score is further executable by the one or more processors to perform:
computing the advantage score of node $s_i$ over $s_j$ in accordance with:

Advantage Score $AS = u_i \cdot v_j - u_j \cdot v_i$.

wherein:
$u_i$ represents a source node for job position $s_i$;
$u_j$ represents a source node for job position $s_j$;
$v_i$ represents a destination node for job position $s_i$; and
$v_j$ represents a destination node for job position $s_j$.

* * * * *